United States Patent
Braunschvig et al.

(10) Patent No.: US 10,152,371 B1
(45) Date of Patent: Dec. 11, 2018

(54) END-TO-END DATA PROTECTION FOR DISTRIBUTED STORAGE

(71) Applicant: EMC IP Holding Company LLC, Hopkinton, MA (US)

(72) Inventors: Gilad Braunschvig, Tel Aviv (IL); Tal Ben-Moshe, Kiryat Ono (IL); Zvi Schneider, Hod Hasharon (IL); David Krakov, Ramat Gan (IL); Amitai Alkalay, Kadima (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 85 days.

(21) Appl. No.: 15/281,593

(22) Filed: Sep. 30, 2016

(51) Int. Cl.
| | | |
|---|---|---|
| *G06F 11/00* | (2006.01) | |
| *G06F 11/10* | (2006.01) | |
| *G06F 11/07* | (2006.01) | |
| *G06F 11/14* | (2006.01) | |
| *G06F 11/30* | (2006.01) | |

(52) U.S. Cl.
CPC ...... *G06F 11/1004* (2013.01); *G06F 11/0727* (2013.01); *G06F 11/0787* (2013.01); *G06F 11/1056* (2013.01); *G06F 11/1435* (2013.01); *G06F 11/1451* (2013.01); *G06F 11/1464* (2013.01); *G06F 11/3065* (2013.01); *G06F 2201/84* (2013.01)

(58) Field of Classification Search
CPC ............. G06F 11/0787; G06F 11/1435; G06F 11/1451; G06F 11/1464; G06F 11/3065; G06F 11/0727; G06F 11/10; G06F 11/1044; G06F 11/1056; G06F 11/1076; G06F 11/1004
See application file for complete search history.

(56) References Cited

U.S. PATENT DOCUMENTS

| | | | |
|---|---|---|---|
| 4,309,569 | A | 1/1982 | Merkle |
| 5,204,958 | A | 4/1993 | Cheng et al. |
| 6,085,198 | A | 7/2000 | Skinner et al. |
| 6,125,399 | A | 9/2000 | Hamilton |
| 6,671,694 | B2 | 12/2003 | Baskins et al. |
| 7,035,971 | B1 | 4/2006 | Merchant |
| 7,203,796 | B1 | 4/2007 | Muppalaneni et al. |
| 7,472,249 | B2 | 12/2008 | Cholleti et al. |

(Continued)

FOREIGN PATENT DOCUMENTS

| | | |
|---|---|---|
| JP | 2014-206884 | 10/2014 |
| WO | WO 2017/070420 A1 | 4/2017 |

OTHER PUBLICATIONS

U.S. Office Action dated Aug. 27, 2015 corresponding to U.S. Appl. No. 14/228,971; 23 Pages.

(Continued)

*Primary Examiner* — Joseph D Manoskey
(74) *Attorney, Agent, or Firm* — Daly, Crowley, Mofford & Durkee, LLP (57) ABSTRACT

A computer program product, system, and method for generating coded fragments comprises receiving, at a first node of a distributed storage system, an I/O request to write a block; splitting the block into a plurality of sub blocks; generating a sub block error detection hash for each of the sub blocks; sending the block and the sub block error detection hashes to a second node within the distributed storage system; and storing the block and the sub block error detection hashes to a storage device at the second node.

14 Claims, 8 Drawing Sheets

(56) References Cited

U.S. PATENT DOCUMENTS

| | | | |
|---|---|---|---|
| 7,908,484 | B2 | 3/2011 | Haukka et al. |
| 8,386,425 | B1 | 2/2013 | Kadayam et al. |
| 8,386,433 | B1 | 2/2013 | Kadayam |
| 8,799,705 | B2 | 8/2014 | Hallak et al. |
| 9,104,326 | B2 | 8/2015 | Frank et al. |
| 9,367,398 | B1 | 6/2016 | Ben-Moshe et al. |
| 9,442,941 | B1 | 9/2016 | Luz et al. |
| 9,703,789 | B2* | 7/2017 | Bowman .......... G06F 17/30097 |
| 9,886,314 | B2 | 2/2018 | Borowiec et al. |
| 2003/0061227 | A1 | 3/2003 | Baskins et al. |
| 2004/0267835 | A1 | 12/2004 | Zwilling et al. |
| 2006/0271540 | A1 | 11/2006 | Williams |
| 2007/0240125 | A1 | 10/2007 | Degenhardt et al. |
| 2008/0082969 | A1 | 4/2008 | Agha et al. |
| 2008/0235793 | A1 | 9/2008 | Schunter et al. |
| 2009/0216953 | A1 | 8/2009 | Rossi |
| 2010/0005233 | A1 | 1/2010 | Hosokawa |
| 2010/0250611 | A1 | 9/2010 | Krishnamurthy |
| 2011/0087854 | A1 | 4/2011 | Rushworth et al. |
| 2011/0137916 | A1 | 6/2011 | Deen et al. |
| 2011/0302587 | A1 | 12/2011 | Nishikawa et al. |
| 2012/0023384 | A1* | 1/2012 | Naradasi ............. G06F 11/1012 714/763 |
| 2012/0124282 | A1 | 5/2012 | Frank et al. |
| 2012/0158736 | A1 | 6/2012 | Milby |
| 2012/0204077 | A1* | 8/2012 | D'Abreu ............. G06F 11/1012 714/755 |
| 2012/0233432 | A1 | 9/2012 | Feldman et al. |
| 2013/0036289 | A1 | 2/2013 | Welnicki et al. |
| 2013/0212074 | A1* | 8/2013 | Romanski ........... G06F 12/0253 707/692 |
| 2013/0290285 | A1 | 10/2013 | Gopal et al. |
| 2013/0318053 | A1 | 11/2013 | Provenzano et al. |
| 2013/0326318 | A1* | 12/2013 | Haswell .............. G06F 11/1004 714/807 |
| 2013/0346716 | A1* | 12/2013 | Resch ................... G06F 3/0619 711/162 |
| 2014/0019764 | A1 | 1/2014 | Gopal et al. |
| 2014/0032992 | A1 | 1/2014 | Hara et al. |
| 2014/0122823 | A1 | 5/2014 | Gupta et al. |
| 2014/0244598 | A1 | 8/2014 | Haustein et al. |
| 2015/0019507 | A1 | 1/2015 | Aronovich |
| 2015/0098563 | A1 | 4/2015 | Gulley et al. |
| 2015/0149789 | A1 | 5/2015 | Seo et al. |
| 2015/0186215 | A1 | 7/2015 | Das Sharma et al. |
| 2015/0199244 | A1 | 7/2015 | Venkatachalam et al. |
| 2015/0205663 | A1 | 7/2015 | Sundaram et al. |
| 2015/0263986 | A1 | 9/2015 | Park et al. |
| 2016/0011941 | A1 | 1/2016 | He et al. |
| 2016/0110252 | A1* | 4/2016 | Hyun ..................... G11C 29/52 714/766 |
| 2016/0132270 | A1 | 5/2016 | Miki |
| 2017/0115878 | A1 | 4/2017 | Dewaikar |
| 2017/0123995 | A1 | 5/2017 | Freyensee et al. |
| 2017/0255515 | A1 | 9/2017 | Kim et al. |

OTHER PUBLICATIONS

Response to U.S. Office Action dated Aug. 27, 2015 corresponding to U.S. Appl. No. 14/228,971; Response filed on Jan. 14, 2016; 10 Pages.
U.S. Final Office Action dated Feb. 25, 2016 corresponding to U.S. Appl. No. 14/228,971; 27 Pages.
Request for Continued Examination (RCE) and Response to Final Office Action dated Feb. 25, 2016 corresponding to U.S. Appl. No. 14/228,971; Response filed on May 25, 2016; 12 Pages.
U.S. Office Action dated Jun. 10, 2016 corresponding to U.S. Appl. No. 14/228,971; 27 Pages.
Response to U.S. Office Action dated Jun. 10, 2016 corresponding to U.S. Appl. No. 14/228,971; Response filed Aug. 17, 2016; 10 Pages.
U.S. Final Office Action dated Oct. 4, 2016 corresponding to U.S. Appl. No. 14/228,971; 37 Pages.
U.S. Office Action dated Sep. 22, 2015 corresponding to U.S. Appl. No. 14/228,982; 17 Pages.
Response to U.S. Office Action dated Sep. 22, 2015 corresponding to U.S. Appl. No. 14/228,982; Response filed on Feb. 1, 2016; 10 Pages.
Notice of Allowance dated Apr. 26, 2016 corresponding to U.S. Appl. No. 14/228,982; 9 Pages.
U.S. Office Action dated Jan. 12, 2016 corresponding to U.S. Appl. No. 14/229,491; 12 Pages.
Response to Office Action dated Jan. 12, 2016 corresponding to U.S. Appl. No. 14/229,491; Response filed on Jun. 2, 2016; 7 Pages.
Notice of Allowance dated Jul. 25, 2016 corresponding to U.S. Appl. No. 14/229,491; 10 Pages.
EMC Corporation, "Introduction to the EMC XtremIO Storage Array;" Version 4.0; White Paper—A Detailed Review; Apr. 2015; 65 Pages.
Vijay Swami, "XtremIO Hardware/Software Overview & Architecture Deepdive;" EMC On-Line Blog; Nov. 13, 2013; Retrieved from <http://vjswami.com/2013/11/13/xtremio-hardwaresoftware-overview-architecture-deepdive/>; 18 Pages.
U.S. Non-Final Office Action dated Nov. 28, 2017 corresponding to U.S. Appl. No. 15/079,205; 9 Pages.
U.S. Non-Final Office Action dated Dec. 29, 2017 corresponding to U.S. Appl. No. 15/079,208; 10 Pages.
U.S. Non-Final Office Action dated Dec. 22, 2017 corresponding to U.S. Appl. No. 15/282,546; 12 Pages.
Notice of Allowance dated Sep. 22, 2017 for U.S. Appl. No. 15/079,215; 9 Pages.
Response (w/RCE) to U.S. Final Office Action dated Jun. 20, 2017 for U.S. Appl. No. 14/228,971; Response filed Sep. 13, 2017; 14 Pages.
Response to U.S. Non-Final Office Action dated Feb. 9, 2017 for U.S. Appl. No. 14/228,971; Response filed on May 9, 2017; 12 Pages.
Response to U.S. Non-Final Office Action dated Apr. 21, 2017 for U.S. Appl. No. 15/079,215; Response filed on Jul. 21, 2017; 9 Pages.
U.S. Non-Final Office Action dated Feb. 9, 2017 for U.S. Appl. No. 14/228,971; 38 Pages.
Response to U.S. Non-Final Office Action dated Dec. 1, 2017 for U.S. Appl. No. 14/979,890; Response filed on Feb. 28, 2018; 9 Pages.
Response to U.S. Non-Final Office Action dated Nov. 28, 2017 for U.S. Appl. No. 15/079,205; Response filed on Feb. 28, 2018; 11 Pages.
Response to U.S. Non-Final Office Action dated Nov. 13, 2017 for U.S. Appl. No. 15/079,213; Response filed on Feb. 13, 2018; 9 Pages.
Response to Office Action dated Jun. 2, 2017 from U.S. Appl. No. 15/079,208, filed Sep. 5, 2017; 10 Pages.
Request for Continued Examination (RCE) and Response to Final Office Action dated Oct. 4, 2016 corresponding to U.S. Appl. No. 14/228,971; RCE and Response filed on Jan. 4, 2017; 19 Pages.
Non-Final Office Action dated Nov. 13, 2017 for U.S. Appl. No. 15/079,213; 9 pages.
Non-Final Office Action dated Jun. 2, 2017 for U.S. Appl. No. 15/079,208; 19 Pages.
U.S. Final Office Action dated Jun. 20, 2017 for U.S. Appl. No. 14/228,971; 40 Pages.
U.S. Non-Final Office Action dated Dec. 1, 2017 for U.S. Appl. No. 14/979,890; 10 Pages.
Response to U.S. Non-Final Office Action dated Oct. 4, 2017 corresponding to U.S. Appl. No. 14/228,971; Response filed Jan. 26, 2018; 11 Pages.
U.S. Non-Final Office Action dated Oct. 4, 2017 for U.S. Appl. No. 14/228,971; 37 pages.
U.S. Non-Final Office Action dated Apr. 21, 2017 for U.S. Appl. No. 15/079,215; 53 Pages.
U.S. Final Office Action dated May 29, 2018 for U.S. Appl. No. 14/228,971; 35 pages.
U.S. Appl. No. 14/228,971, filed Mar. 28, 2014, Shoikhet et al.
U.S. Appl. No. 14/979,890, filed Dec. 28, 2015, Meiri et al.
U.S. Appl. No. 15/079,205, filed Mar. 24, 2016, Dorfman et al.

(56) References Cited

OTHER PUBLICATIONS

U.S. Appl. No. 15/079,208, filed Mar. 24, 2016, Ben-Moshe et al.
U.S. Appl. No. 15/079,213, filed Mar. 24, 2016, Ben-Moshe et al.
U.S. Appl. No. 15/079,215, filed Mar. 25, 2016, Krakov et al.
U.S. Appl. No. 15/282,546, filed Sep. 30, 2016, Kucherov et al.
U.S. Appl. No. 15/281,594, filed Sep. 30, 2016, Bigman.
U.S. Non-Final Office Action dated Jun. 27, 2018 for U.S. Appl. No. 15/281,597; 10 pages.
Response to U.S. Non-Final Office Action dated Dec. 29, 2017 for U.S. Appl. No. 15/079,208; Response filed on Apr. 30, 2018; 7 Pages,
Response to U.S. Non-Final Office Action dated Dec. 22, 2017 for U.S. Appl. No. 15/282,546; Response filed May 17, 2018; 8 Page.

* cited by examiner

END-TO-END DATA PROTECTION FOR DISTRIBUTED STORAGE

BACKGROUND

Distributed storage systems may include a cluster of nodes, each capable of processing I/O requests and/or storing data. A node that receives an I/O request may be different from the node on which the requested data is stored. There is opportunity for data corruption within a storage device (e.g., disk or flash-based storage) and also on communication lines between the nodes.

Many distributed storage systems store data in fixed-size blocks (e.g., 8 KB blocks). Some distributed storage systems support "small" reads and writes, meaning I/O requests to read/write data that is smaller than a full block.

SUMMARY

In some embodiments, systems and methods provide end-to-end data protection in a distributed storage system, while reducing the computation and bandwidth required for small reads and writes, as compared to existing systems and methods. In certain embodiments, a system/method does not require a full block of data to be transmitted between nodes if only a small portion of the block is being read. In many embodiments, a system/method does not require re-computing a hash over a full block if only a small portion of the block is updated.

According to an aspect of the disclosure, a method comprises: receiving, at a first node of a distributed storage system, an I/O request to write a block; splitting the block into a plurality of sub blocks; generating a sub block error detection hash for each of the sub blocks; sending the block and the sub block error detection hashes to a second node within the distributed storage system; and storing the block and the sub block error detection hashes to a storage device at the second node.

In some embodiments, generating a sub block error detection hash comprises calculating a hash of a sub block. In another embodiment, a method further comprises calculating a block error detection hash using the sub block error detection hashes, and adding the block error detection hash to metadata within the distributed storage system.

In one embodiment, calculating a block error detection hash using the sub block error detection hashes comprises: concatenating the sub block error detection hashes together, and calculating a hash of the concatenated sub block error detection hashes. In another embodiment, generating a sub block error detection hash for each of the sub blocks comprises generating two or more of the sub block error detection hashes in parallel.

In other embodiments, a method further comprises receiving, at the first node, an I/O request to read one or more sub blocks of the block; reading the requested sub blocks and corresponding sub block error detection hashes from the storage device at the second node; generating, at the second node, an expected error detection hash using the read sub block error detection hashes; sending the read sub blocks and the expected error detection hash from the second node to the first node; generating, at the first node, an actual error detection hash of the read sub blocks; and reporting data corruption if the actual error detection hash and expected error detection hash do not match. In some embodiments, generating an expected error detection hash using the read sub block error detection hashes comprises: concatenating the read sub block error detection hashes together, and calculating a hash of the concatenated read sub block error detection hashes.

In one embodiment, a method further comprises receiving, at the first node, an I/O request comprising one or more updated sub blocks; generating an updated sub block error detection hash for each of the updated sub blocks; sending the updated sub blocks and the updated sub block error detection hashes from the first node to the second node; reading one or more original sub blocks and corresponding sub block error detection hashes from the storage device; generating an updated block using the original sub blocks and the updated sub blocks; and writing the updated block, the original sub block error detection hashes, and the updated sub block error detection hashes to the storage device. In another embodiment, calculating an updated block error detection hash using the original sub block error detection hashes and the updated sub block error detection hashes, and adding the updated block error detection hash to metadata within the distributed storage system.

According to another aspect of the disclosure, a system comprises a processor, a volatile memory, and a non-volatile memory. The non-volatile memory may store computer program code that when executed on the processor causes the processor to execute a process operable to perform one or more embodiments of the method described hereinabove.

According to yet another aspect of the disclosure, a computer program product may be tangibly embodied in a non-transitory computer-readable medium, the computer-readable medium storing program instructions that are executable to perform one or more embodiments of the methods described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. In certain embodiments, as may be used herein, the term "storage system" may be broadly construed so as to encompass, for example, private or public cloud computing systems for storing data as well as systems for storing data comprising virtual infrastructure and those not comprising virtual infrastructure. In some embodiments, as may be used herein, the terms "client," "customer," and "user" may refer to any person, system, or other entity that uses a storage system to read/write data.

In many embodiments, as may be used herein, the term "storage device" may refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). In certain embodiments, the term "storage array" may be used herein to refer to any collection of storage devices. In some embodiments herein, for simplicity of explanation, the term "disk" may be used synonymously with "storage device."

In many embodiments, as may be used herein, the term "random access storage device" may refer to any non-volatile random access memory (i.e., non-volatile memory wherein data can be read or written in generally the same amount of time irrespective of the physical location of data inside the memory). Non-limiting examples of random access storage devices may include NAND-based flash memory, single level cell (SLC) flash, multilevel cell (MLC) flash, and next generation non-volatile memory (NVM). For simplicity of explanation, the term "disk" may be used synonymously with "storage device" herein.

In certain embodiments, the term "I/O request" or simply "I/O" may be used to refer to an input or output request. In some embodiments, an I/O request may refer to a data read or write request.

In some embodiments, vendor-specific terminology may be used herein to facilitate understanding, it is understood that the concepts, techniques, and structures sought to be protected herein are not limited to use with any specific commercial products.

Figure 1A:
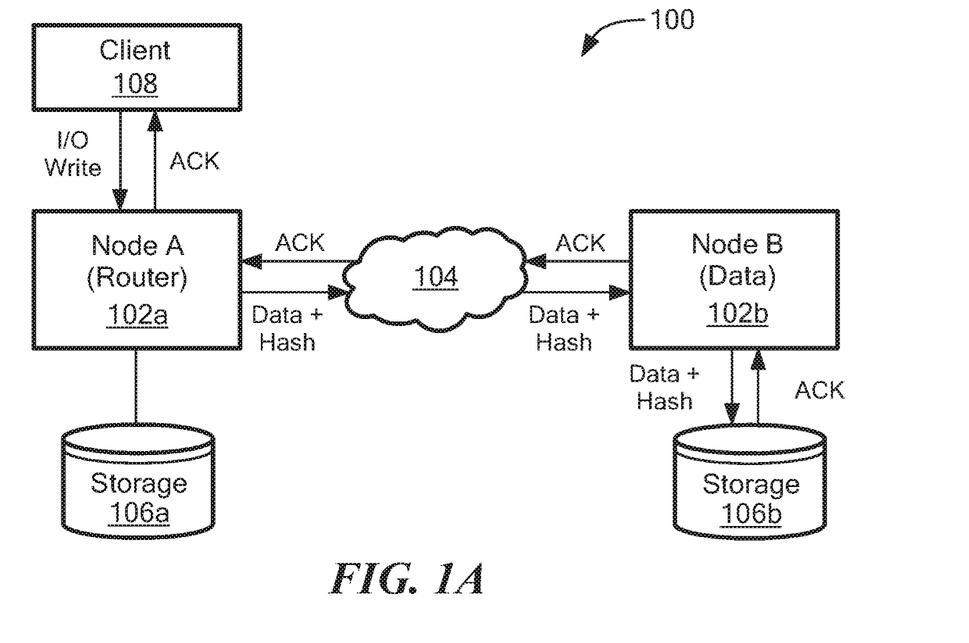
FIGS. 1A and 1B are diagrams illustrating I/O request processing within a distributed storage system, in accordance with an embodiment of the disclosure.
Figure 1B:
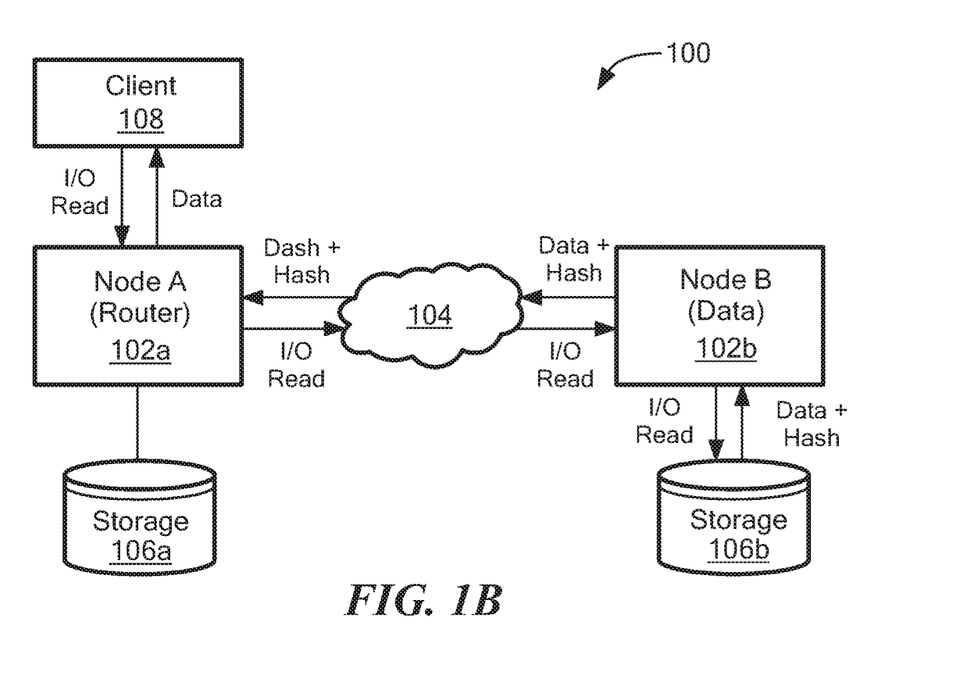

Referring to the embodiments of FIGS. 1A and 1B, a distributed storage system 100 includes a plurality of nodes 102a, 102 (102 generally) connected via a network 104. Each node 102 may include, or otherwise have access to, one or more storage devices 106a, 106b (106 generally). A storage device 106 may be attached to a node 102 directly (i.e., direct-attached storage, "DAS") or via a network (i.e., network-attached storage, "NAS").

The distributed storage system 100 stores data in the storage 106 in fixed-size blocks, for example 8 KB blocks. Each block has a fingerprint that uniquely identifies the data within that block. A block's fingerprint can be generated using a fingerprint function that takes the block's data as input. In various embodiments, the fingerprint function is a hash function, such as Secure Hash Algorithm 1 (SHA-1). In other embodiments, the fingerprint function may be a function that computes an error correcting code.

Referring again to FIG. 1A, each unique block of data, as identified by its fingerprint, may be stored on one or more storage device 106. A node 102 to which a storage device 106 is attached is responsible for reading and writing the blocks stored thereon. The storage system 100 maintains a mapping between fingerprints and where the corresponding unique blocks are stored within the storage system 100.

Each node 102 may be configured to receive I/O requests from clients 108. I/O requests may include "full" reads/writes and "small" reads/writes. A full read/write is a request to read/write a full block of data (e.g., 8 KB of data), whereas a small read/write is a request to read/write less than a full block of data (e.g., less than 8 KB of data). The node 102 that initially receives a client I/O request may be different from the node that is responsible for actually reading/writing the request data. In this situation, the node that initially receives the request (referred to herein as the "router node") delegates the I/O request to the reading/writing node (referred to herein as the "data node"). Each node 102 may function as either a router node or a data node, depending on the data flow for a particular I/O request. In some embodiments, a node of the distributed storage system may be the same as or similar to the embodiment of FIG. 2, which is described in detail below.

Some embodiments of the present disclosure can provide end-to-end data protection by detecting (and in some cases correcting) data corruption that may occur within a storage device and/or on a communication line between two nodes.

FIG. 1A illustrates the lifecycle of an I/O write request within a distributed storage system 100, according to an embodiment of the disclosure. A client 108 sends the I/O write request to node 102a (which is designated as the router node for the I/O write request by virtue of it receiving the request). The router node 102a determines that the request data should be written to storage device 106b attached to node 102b (which is designated as the data node by virtual of its responsibility for writing the request data). The router node 102a generates an error detection hash for the request data and sends both the data and the error detection hash to the data node 102b, as shown.

The data node 102b writes the data and error detection hash together to its attached storage device 106b. In some embodiments, the storage system 100 may perform additional processing, such as updating metadata to track the storage location of the unique block. In such embodiments, after the data and error detection hash are successfully written to the storage device 106, acknowledgements (ACK) may be sent from the data node 102b to the router node 102a, and from the router node 102a to the client 108.

FIG. 1B illustrates the lifecycle of an I/O read request within the distributed storage system 100, according to an embodiment of the disclosure. The client 108 sends an I/O read request to node 102a (the designated router node for the I/O read request). The router node 102a determines that the requested data is stored on storage device 106b attached to node 102b (the designated data node for the I/O read request). The router node 102a forwards the I/O read request to the data node 102b, which reads the requested data from the storage device 106b along with the previously stored error detection hash for the data. The data node 102b returns the data and error detection hash to the router node 102a. The router node 102a generates an error detection hash for the data and compares the generated (or "actual") code against the returned (or "expected") code to detect any corruption of the data. If corruption is detected, an appropriate error may be returned to the client 108. Otherwise the data is returned to the client 108.

It will be appreciated that the embodiments of FIGS. 1A and 1B may provide end-to-end data protection. In various embodiments, the distributed storage system may provide efficient end-to-end data protection for small reads and writes using techniques described below in conjunction with FIGS. 3A, 3B, and 4A-4D. In some embodiments, the distributed storage system 100 may include an EMC® XTREMIO® system.

Figure 2:
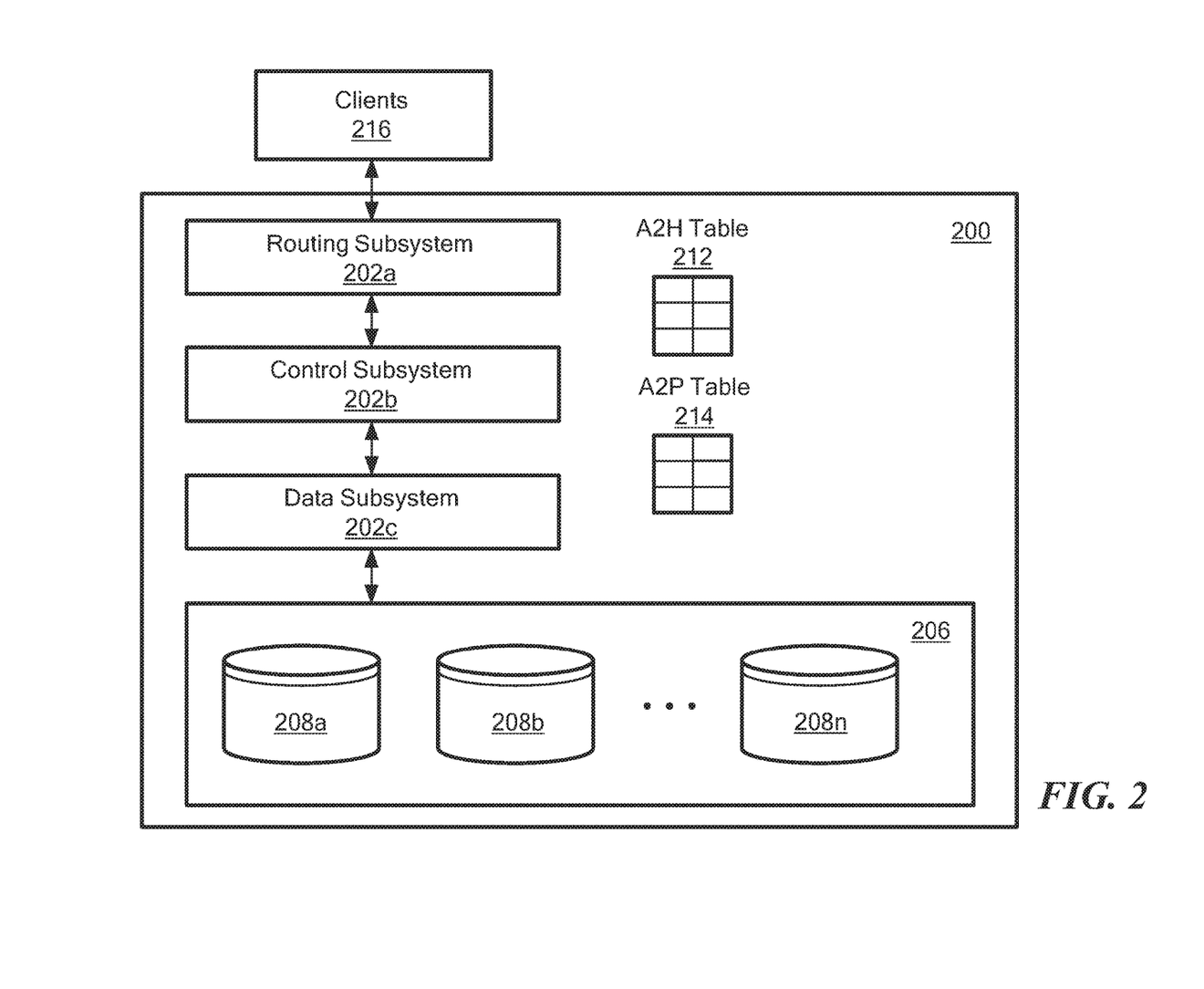
FIG. 2 is a block diagram of a node of a distributed storage system, in accordance with an embodiment of the disclosure.

FIG. 2 shows a node 200 of a distributed storage system, according to an embodiment of the disclosure. The node 200 includes a plurality of subsystems 202a-202c (generally denoted 202 herein) and a storage array 206 comprising a plurality of storage devices 208a . . . 208n (generally denoted 208 herein). In some embodiments, the storage devices 208 may be provided as disk drives (HDDs) or solid-state disks (SSDs).

In the embodiment of FIG. 2, the subsystems 202 include a routing subsystem 202a, a control subsystem 202b, and a data subsystem 202c. In some embodiments, the subsystems may be provided as software components, i.e., computer program code that, when executed on a processor, may cause a computer to perform functionality described herein. In a certain embodiment, the storage system includes an operating system (OS) and one or more of the subsystems may be provided as user space processes executable by the OS. In other embodiments, a subsystem may be provided, at least in part, as hardware such as digital signal processor (DSP) or an application specific integrated circuit (ASIC) configured to perform functionality described herein.

Referring again to FIG. 2, the routing subsystem 202a can receive I/O requests from clients 216. The routing subsystem 202a determines if the I/O request should be processed locally (i.e., by the node 200) or if it should be processed by a remote node. In some embodiments, the routing subsystem is configured to receive Small Computer System Interface (SCSI) commands from clients.

Referring back to FIG. 2, the control subsystem 202b maintains a mapping 212 between I/O addresses and corresponding block fingerprints. The mapping 212 is referred to herein as an "I/O address to block hash mapping table" or "A2H table." In one embodiment, I/O addresses may be logical addresses used by clients to access data within a storage system. In some embodiments, I/O addresses correspond to logical block addresses (LBAs).

Referring back to FIG. 2, the data subsystem 202c reads/writes data from/to the storage array 206. The data subsystem 202c maintains a mapping 214 between block fingerprints and storage locations (i.e., physical storage addresses within the storage array 206). The mapping 214 is referred to herein as a "hash to physical address mapping table" or "H2P table." It will be appreciated that combinations of the A2H table 212 and the H2P table 214 can provide multiple levels of indirection between the logical (or "I/O") address a client 216 uses to access data and the physical address where that data is stored.

In some embodiments in addition to storing data, the storage array 206 may store various types of metadata used by the storage system node 200. In such embodiments, metadata may include information within the A2H and H2P tables 212, 214. In particular embodiments, metadata may be used by the various subsystems 202 during the course of processing I/O operations.

Figure 3A:
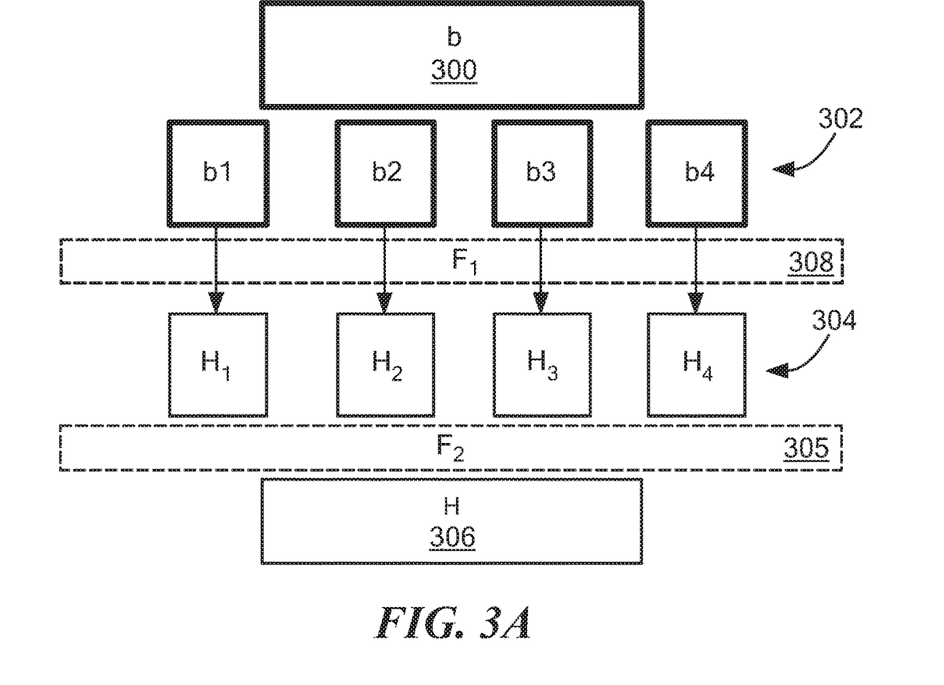
FIGS. 3A and 3B are diagrams illustrating a technique for generating a block error detection hash, according to embodiments of the disclosure.
Figure 3B:
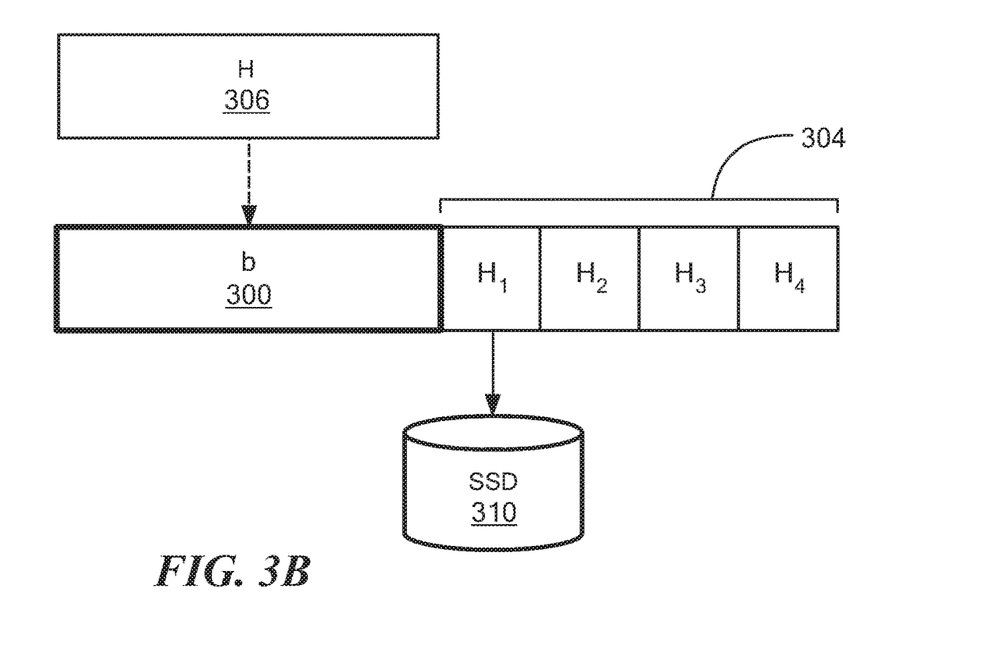

FIGS. 3A and 3B illustrate a technique for generating and storing block error detection hash that can be used to provide efficient end-to-end data protection, according to some embodiments.

Referring to FIG. 3A, a block b 300 may be split into four (4) sub blocks $b_1$, $b_2$, $b_3$, and $b_4$. In other embodiments, a block may be split into a plurality (N) of sub blocks $b_1$, $b_2$, ..., $b_N$. Referring to FIG. 3A, for each sub block (i) 302, a so-called "sub block error detection hash" ($H_i$) 304 is generated using a first code generation function $F_1$ 308:

$$H_i = F_1(b_i)$$

The sub block error detection hashes 304 may be concatenated together and the concatenation may be passed as input to a second code generation function $F_2$ 305 to generate a "full" block error detection hash (H) 306:

$$H = F_2(F_1(b_1) \cdot F_1(b_2) \cdot \ldots \cdot F_1(b_N)) = F_2(H_1 \cdot H_2 \cdot \ldots \cdot H_N).$$

In various embodiments, during certain I/O operations, the full block error detection hash 306 may be re-generated using only the sub block error detection hashes 302 (e.g., to reduce processing). In certain embodiments, sub block error detection hashes $H_1$, $H_2$, etc. may be generated in parallel.

Referring again to FIG. 3A, the code generation functions $F_1$ and $F_2$ can be any functions that take arbitrary-sized input (e.g., a stream) and provide a constant length output that is deterministic over time. In some embodiments, a code generation function may be a hash function, such as SHA-1. In other embodiments, a code generation function may be a function that calculates an error correcting code. In certain embodiments, the first code generation function $F_1$ and the second code generation function $F_2$ may be the same function. In one embodiment, a code generation function may be the same as a function used to generate block fingerprints (e.g., fingerprints used as metadata to provide content-aware storage, as described above in conjunction with FIGS. 1 and 2).

Referring to FIG. 3B, the block 300 and the sub block error detection hashes 304 may be stored together within a storage device 310, according to some embodiments. In particular, the sub block error detection hashes 304 are concatenated with the block 300, and the concatenation may be written to the storage device in a single I/O operation. In certain embodiments, blocks may be compressed in storage. In such embodiments, a block may be compressed, the corresponding sub block error detection hashes may be concatenated to the compressed block, and the concatenation may be written to the storage device in a single I/O operation.

FIGS. 4A-4D are flow diagrams showing illustrative processing that can be implemented within a distributed storage system, such as system 100 of FIGS. 1A and 1B. Rectangular elements (typified by element 402 in FIG. 4A), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Figure 4A:
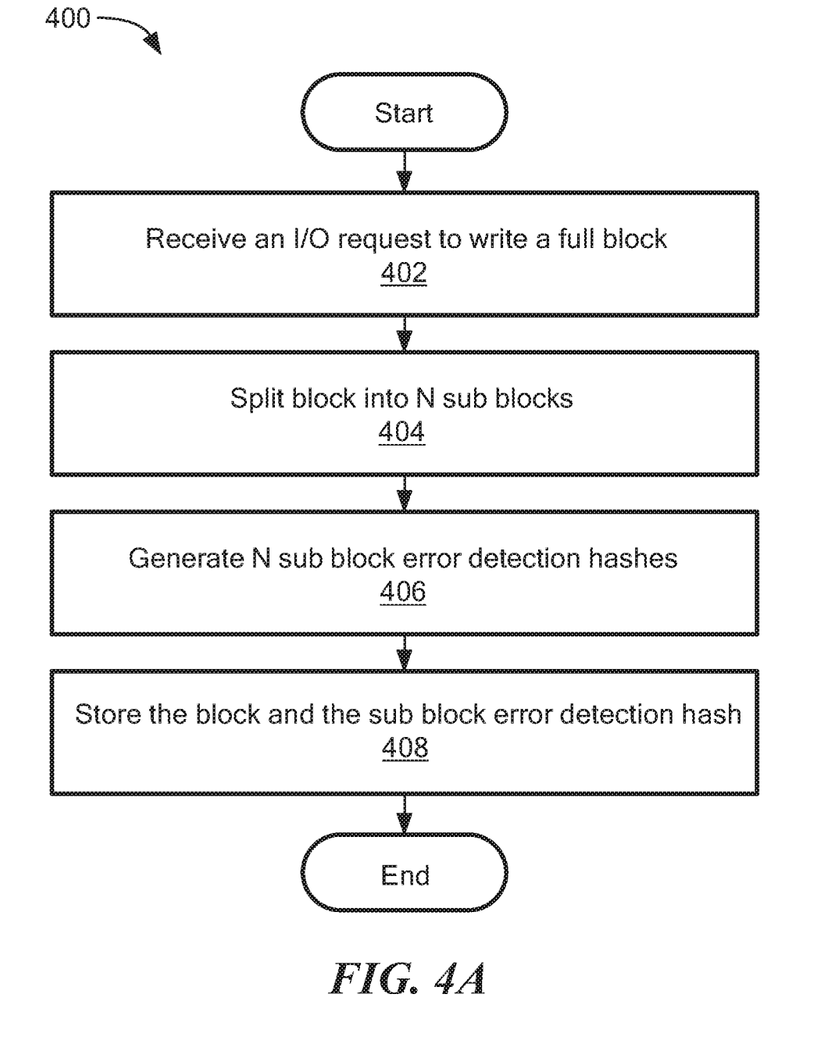
FIGS. 4A-4D are flow diagrams illustrating processing that may occur within a distributed storage system, in accordance with embodiments of the disclosure.

Referring to FIG. 4A, a method 400 processes an I/O request to write a full block of data, according to an embodiment. At block 402, the I/O request is received. In many embodiments, the I/O request may be received at a first node within a distributed storage system.

Referring back to FIG. 4A, at block 404, the block is split into a plurality (N) of sub blocks. In some embodiments, N=4. In one embodiment, the full block may be 8 KB in size, and each sub block may be 2 KB in size.

In the embodiment of FIG. 4A, at block 406, a sub block error detection hash may be generated for each sub block: $H_1 = F(b_1)$, $H_2 = F_1(b_2)$, ..., $H_N = F(b_N)$, where $F_1$ is a first code generation function as described above in conjunction with FIG. 3A. In certain embodiments, the sub block error detection hashes may be generated in parallel. In various embodiments, the block and the sub block error detection hashes may be sent from the first node to a second node within the distributed storage system.

Referring again to FIG. 4A, at block 408, the block and sub block error detection hashes are stored. In certain embodiments, the block and sub block error detection hashes may be stored together within a storage device at the second node. In some embodiments, blocks may be compressed within storage. In such embodiments, storing the block to the storage device at the second node may include compressing the block.

Figure 4B:
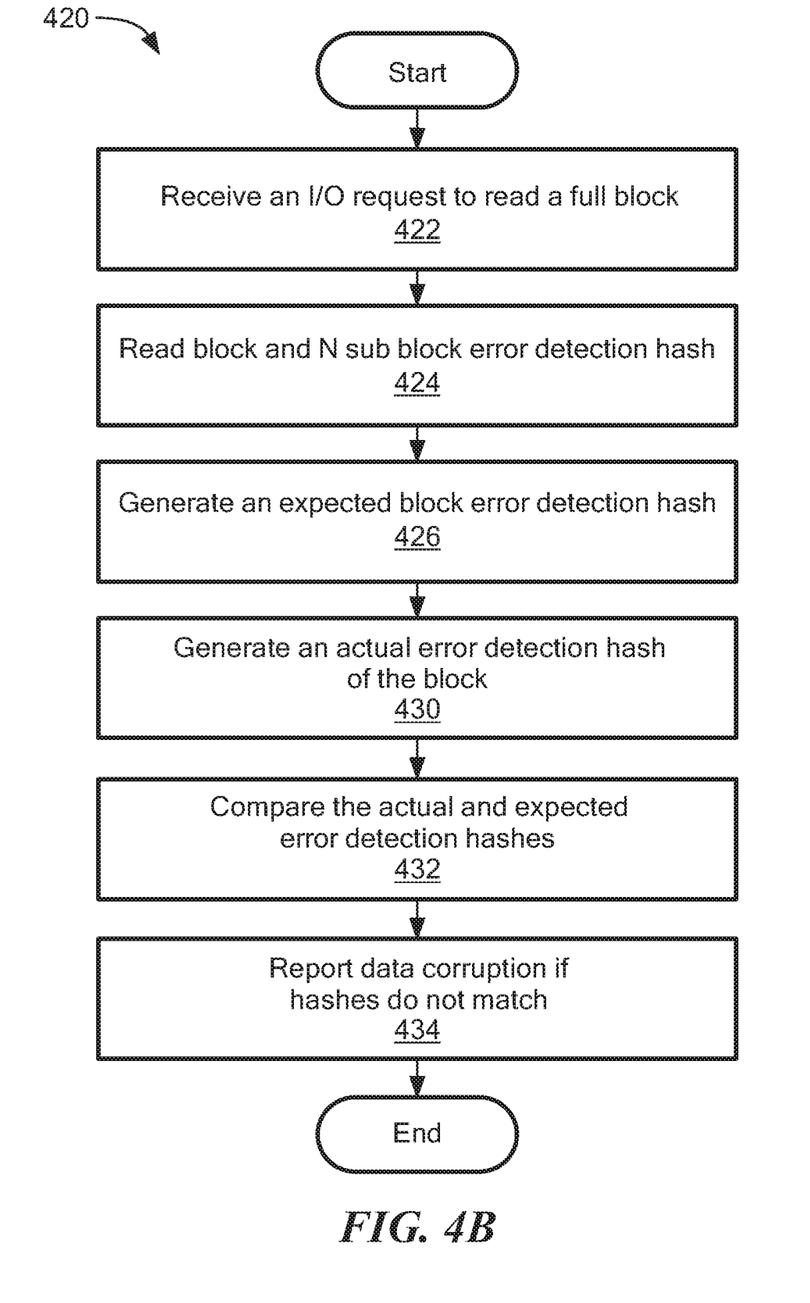

In certain embodiments, the second node generates an error detection hash for the full block using the sub block error detection hashes: $H=F_2(H_1 \cdot H_2 \cdot \ldots \cdot H_N)$, where $F_2$ is second a code generation function as described above in conjunction with FIG. 3A. In one embodiment, the second node stores the full block error detection hash H within a storage device at the second node. In other embodiments, the first node generates the block error detection hash H and sends this value to the second node along with the sub block error detection hashes. In some embodiments, the block error detection hash H is used as the block's unique fingerprint within the distributed storage system (e.g., to provide content-aware storage). In certain embodiments, the block error detection hash may be stored within metadata (e.g., within the A2H table and/or H2P table). Referring to FIG. 4B, a method 420 processes an I/O request to read a full block of data, according to an embodiment. At block 422, the I/O request is received. In some embodiments, the I/O request may be received at a first node of a distributed storage system.

Referring again to FIG. 4B, at block 424, the block and corresponding N sub block error detection hashes $H_1$, $H_2$, . . . , $H_N$ are read. In certain embodiments, the block and corresponding sub block error detection hashes may be read from a storage device at a second node within the distributed storage system. In some embodiments, reading the block from the storage device at the second node may include decompressing the 11) block.

Referring again to FIG. 4B, at block 426, an expected error detection hash $H_{expected}$ is generated. In some embodiments, the expected error detection hash may be generated using the N sub block error detection hashes that were read from storage: $H_{expected}=F(H_1 \cdot H_2 \cdot \ldots \cdot H_N)$. In other embodiments, the expected error detection hash may be retrieved from a storage device at the second node (e.g., a full block error detection hash previously stored within the storage device may be retrieved). In many embodiments, the block and the expected error detection hash may be sent from the second node to the first node.

Referring again to FIG. 4B, at block 430, an actual error detection hash $H_{actual}$ for the block is generated. In some embodiments, the actual error detection hash $H_{actual}$ for the block may be generated at the first node. In certain embodiments, generating the actual error detection hash may include splitting the block into N sub blocks $b_1, b_2, \ldots, b_N$, generating sub block error detection hashes for each sub block, concatenating the sub block error detection hashes together, and generating the actual error detection hash using the concatenated value: $H_{actual}=F_2(F_1(b_1) \cdot F(b_2) \cdot \ldots \cdot F(b_N))$. In certain embodiments, the sub block error detection hashes may be generated in parallel.

Referring back to FIG. 4B, at block 432, the actual error detection hash $H_{actual}$ is compared with the expected error detection hash $H_{expected}$. In some embodiments, the comparison may be performed at the first node. Referring back to FIG. 4B, if the codes do not match, then data corruption is reported (block 434). In some embodiments, reporting data corruption may include returning an error to a client.

Figure 4C:
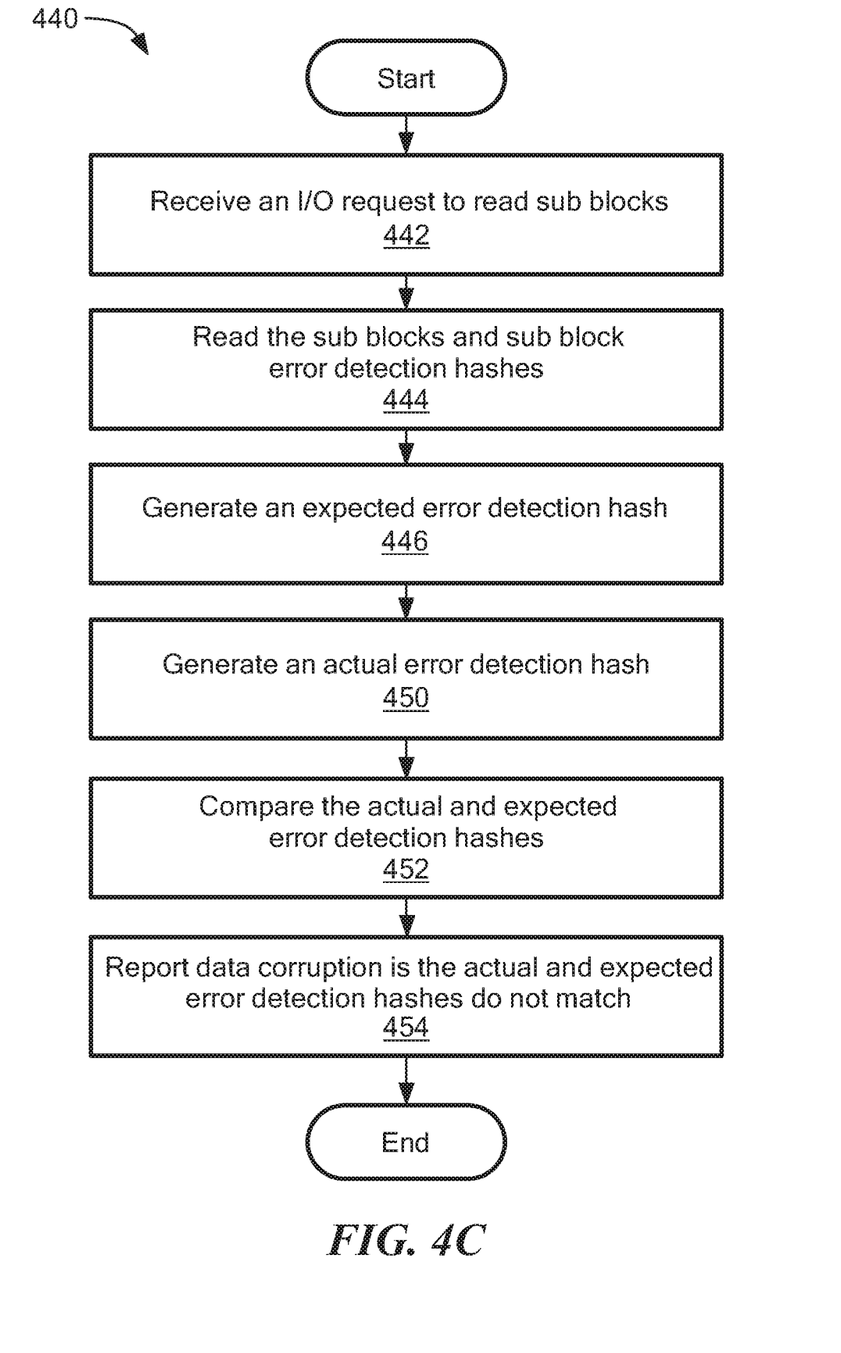

Referring to FIG. 4C, a method 440 processes an I/O request to read less than a full block of data (i.e., a "small read"), according to an embodiment. At block 442, the I/O request is received at a first node of a distributed storage system. The request identifies the portions of the block to read (e.g., the first 4 KB of an 8 KB block). In particular, the request may identify M sub blocks to be read of a block having N total sub blocks, where $1<=M<N$.

Referring again to FIG. 3C, at block 444, the requested sub blocks $b_1, b_2, \ldots, b_M$ and corresponding sub block error detection hashes $H_1, H_2, \ldots, H_M$ are read. In many embodiments, the requested sub blocks and sub block error detection hashes may be read from a storage device at a second node within the distributed storage system. In some embodiments, blocks may be compressed within storage and, thus, reading the M sub blocks may include reading the full block from the storage device, decompressing the full block, and extracting the M sub blocks from the decompressed block.

Referring again to FIG. 4C, at block 446, an expected error detection hash $H_{expected}$ is generated. In some embodiments, the expected error detection hash $H_{expected}$ may be generated at the second node using the M sub block error detection hashes read from the storage device: $H_{expected}=F_2(H_1 \cdot H_2 \cdot \ldots \cdot H_M)$. In various embodiments, the M sub blocks and the expected error detection hash may be sent from the second node to the first node.

Referring again to FIG. 4C, at block 450, an actual error detection hash is generated. In some embodiments, the actual error detection hash may be generated, at the first node, using the M sub blocks: $H_{actual}=F_2(F_1(b_1) \cdot F_1(b_2) \cdot \ldots \cdot F_1(b_M))$.

Referring again to FIG. 4C, at block 452, the actual error detection hash H actual is compared with the expected error detection hash $H_{expected}$. If the codes do not match, then data corruption is reported (block 454). In some embodiments, reporting data corruption may include returning an error to a client.

In various embodiments, the method 440 reduces computation and bandwidth used to process small reads as compared with existing systems, while providing end-to-end data protection.

Figure 4D:
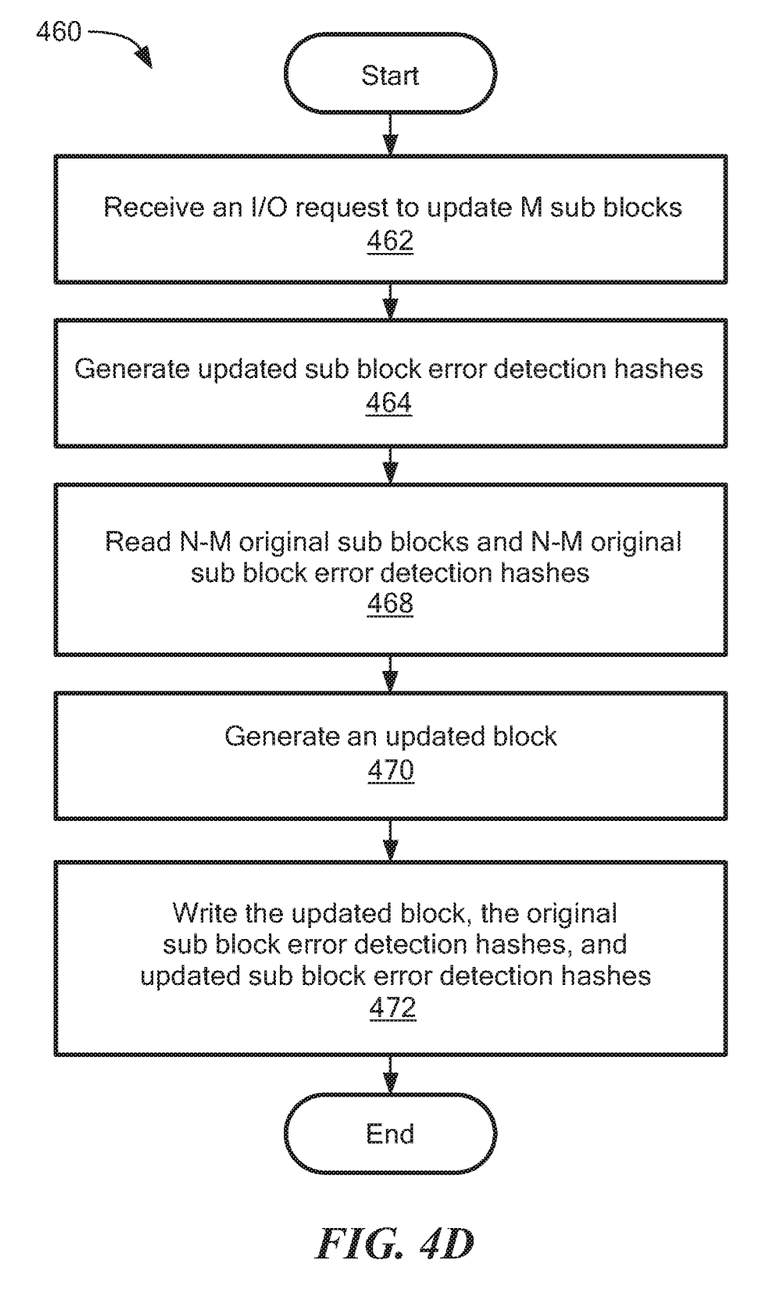

Referring to FIG. 4D, a method 460 processes an I/O request to write less than a full block of data (i.e., a "small write"), according to an embodiment. At block 462, the I/O request is received at a first node of a distributed storage system. The I/O request includes data to be written and may identify a block and an offset within the block where the data should be written to. In some embodiments, the block includes N sub blocks, and the I/O request may be a request to update M of those sub blocks, where $1<=M<N$, wherein the updated sub blocks are denoted $b'_1, b'_2, \ldots, b'_M$. In one embodiment, the I/O request may be a request to update the first 2 KB of an 8 KB block, where N=4 and, thus, M=1.

Referring again to FIG. 4D, at block 464, M updated sub block error detection hashes are generated, one for each of the M updated sub blocks: $H'_1=F_1(b'_1)$, $H'_2=F_1(b'_2), \ldots, H'_M=F_1(b'_M)$. In some embodiments, the M updated sub blocks and sub block error detection hashes may be sent from the first node to a second node within the distributed storage system.

Referring again to FIG. 4D, at block 468, N-M original sub blocks $b_1, b_2, \ldots, b_{N-M}$ and corresponding sub block error detection hashes $H_1, H_2, \ldots, H_{N-M}$ are read. In some embodiments, the original sub blocks $b_1, b_2, \ldots, b_{N-M}$ and the sub block error detection hashes may be read from a storage device at the second node. In many embodiments, the term "original" refers to the sub blocks that will not be updated as a result of the I/O request. In some embodiments, blocks may be compressed within storage and, thus, reading the N-M original sub blocks includes reading the full block, compressing the full block, and extracting the N-M original sub blocks from the decompressed block.

Referring again to FIG. 4D, at block 470, an updated block b' is. In some embodiments, the updated block may be generated by combining the M updated sub blocks $b'_1, b'_2, \ldots, b'_M$ and the N original sub blocks $b_1, b_2, \ldots, b_{N-M}$ in the correct order. In one embodiment, assuming original block $b=b_1 \cdot b_2 \cdot b_3 \cdot b_4$ and the I/O request updates the first block, the updated block may be generated as $b'=b'_1 \cdot b_2 \cdot b_3 \cdot b_4$.

Referring again to FIG. 4D, at block 472, the updated block b', the N-M original sub block error detection hashes $H_1, H_2, \ldots, H_{N-M}$, and the M updated sub block error detection hashes $H'_1, H'_2, \ldots, H'_M$ are written together to a storage device (with the sub block error detection hashes being combined in the correct order). In some embodiments, the storage device may be the same storage device where the original block b was stored, or a different storage device (e.g., a different storage device on the second node or on a different node).

In certain embodiments, the second node may generate a error detection hash of the updated block using the sub block error detection hashes. In one embodiment, assuming the first sub block was updated, the updated block error detection hash may be generated as $H'=F_2(H'_1 \cdot H_2 \cdot \ldots \cdot H_N)$. In some embodiments, the updated block error detection hash may be used as the updated block's unique error detection hash within the distributed storage system. In certain embodiments, the updated block updated block error detection may be stored within metadata (e.g., within the A2H table and/or H2P table).

In various embodiments, the method 460 may reduce computation and bandwidth used to process small writes as compared with existing systems, while providing end-to-end data protection.

Figure 5:
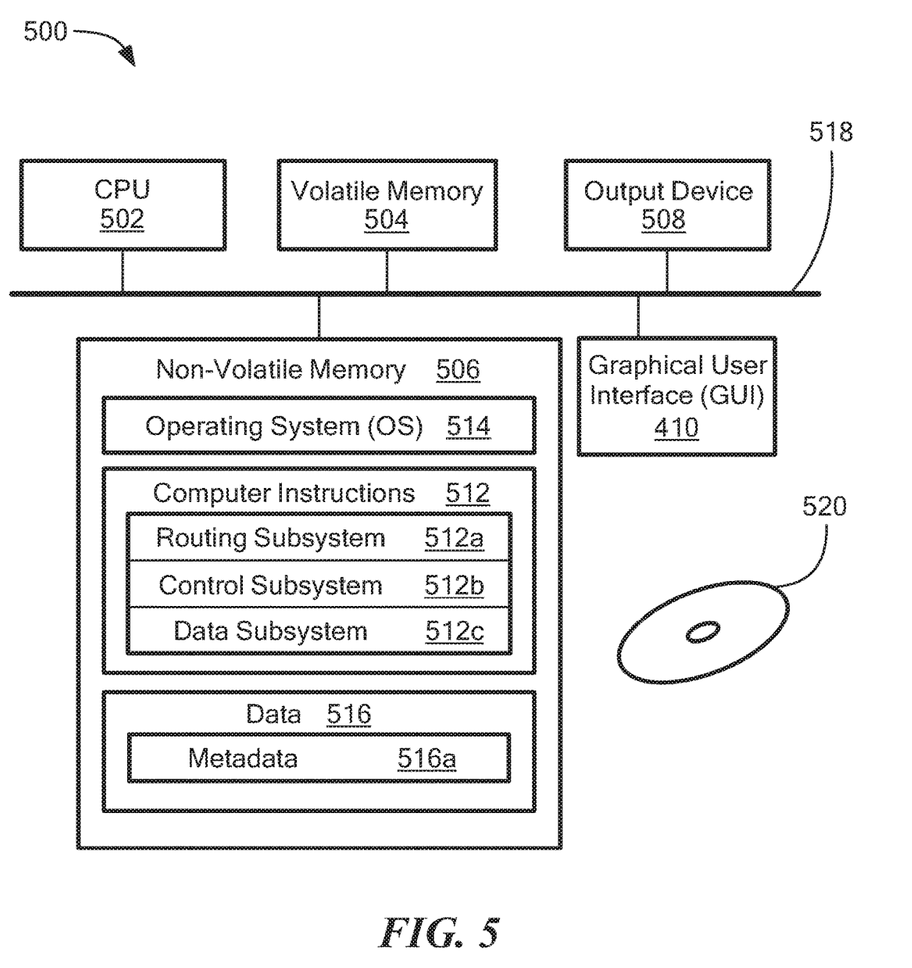
FIG. 5 is a block diagram of a computer on which the processing of FIGS. 4A-4D may be implemented, according to an embodiment of the disclosure.

FIG. 5 shows an illustrative computer (e.g., physical or virtual) or other processing device 500 that can perform at least part of the processing described herein. The computer 500 may include a processor 502, a volatile memory 504, a non-volatile memory 506 (e.g., hard disk or SSD), an output device 508 and a graphical user interface (GUI) 510 (e.g., a mouse, a keyboard, a display, for example), each of which is coupled together by a bus 518. The non-volatile memory 506 is configured to store computer instructions 512, an operating system 514, and data 516. In one embodiment, the computer instructions 512 are executed by the processor 502 out of volatile memory 504. In some embodiments, an article 520 comprises non-transitory computer-readable instructions.

In the embodiment of FIG. 5, computer instructions 512 include router instructions 512a that may correspond to an implementation of a router subsystem 202a (FIG. 2), control subsystem instructions 512b that may correspond to an implementation of a control subsystem 202b, and data subsystem instructions 512c that may correspond to an implementation of a data subsystem 202c. As shown, in some embodiments, non-volatile memory 506 may be configured to store metadata 516a, such as information used within the A2H table 212 and/or the H2P table 214).

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method comprising:
    receiving an I/O request to write a block;
    splitting the block into a plurality of sub blocks;
    generating a sub block error detection hash for each of the sub blocks;
    calculating a block error detection hash by concatenating the sub block error detection hashes together to produce a concatenated sub block error detection hash and calculating a hash of the concatenated sub block error detection hash; and storing the block error detection hash as metadata within a content-aware storage system.

2. The method of claim 1 wherein generating a sub block error detection hash comprises calculating a hash of a sub block.

3. The method of claim 1 wherein generating a sub block error detection hash for each of the sub blocks comprises generating two or more of the sub block error detection hashes in parallel.

4. A method comprising:
receiving an I/O request to write a block, the I/O request being received at a first node of a distributed storage system;
splitting the block into a plurality of sub blocks;
generating a sub block error detection hash for each of the sub blocks;
storing the block and the sub block error detection hashes to a storage device at a second node within the distributed storage system;
receiving, at the first node, an I/O request to read one or more sub blocks of the block;
reading the requested sub blocks and corresponding sub block error detection hashes from the storage device at the second node;
generating, at the second node, an expected error detection hash using the read sub block error detection hashes;
sending the read sub blocks and the expected error detection hash from the second node to the first node;
generating, at the first node, an actual error detection hash of the read sub blocks; and
reporting data corruption if the actual error detection hash and expected error detection hash do not match.

5. The method of claim 4 wherein generating an expected error detection hash using the read sub block error detection hashes comprises:
concatenating the read sub block error detection hashes together to produce a concatenated sub block error detection hash; and
calculating a hash of the concatenated sub block error detection hash.

6. A method comprising:
receiving an I/O request to write a block, the I/O request being received at a first node of a distributed storage system;
splitting the block into a plurality of sub blocks;
generating a sub block error detection hash for each of the sub blocks;
storing the block and the sub block error detection hashes to a storage device at a second node within the distributed storage system;
receiving, at the first node, an I/O request comprising one or more updated sub blocks;
generating an updated sub block error detection hash for each of the updated sub blocks;
sending the updated sub blocks and the updated sub block error detection hashes from the first node to the second node;
reading one or more original sub blocks and corresponding sub block error detection hashes from the storage device;
generating an updated block using the original sub blocks and the updated sub blocks; and writing the updated block, the original sub block error detection hashes, and the updated sub block error detection hashes to the storage device.

7. The method of claim 6 further comprising:
calculating an updated block error detection hash using the original sub block error detection hashes and the updated sub block error detection hashes; and
adding the updated block error detection hash to metadata, within the distributed storage system.

8. A system comprising:
a processor;
a volatile memory; and
a non-volatile memory storing computer program code that when executed on the processor causes the processor to execute a process operable to perform the operations of:
splitting the block into a plurality of sub blocks;
generating a sub block error detection hash for each of the sub blocks;
calculating a block error detection hash by concatenating the sub block error detection hashes together to produce a concatenated sub block error detection hash and calculating a hash of the concatenated sub block error detection hash; and
storing the block error detection hash as metadata within a content-aware storage system.

9. The system of claim 8 wherein generating a sub block error detection hash comprises calculating a hash of a sub block.

10. The system of claim 8 wherein generating a sub block error detection hash for each of the sub blocks comprises generating two or more of the sub block error detection hashes in parallel.

11. A system comprising:
a processor;
a volatile memory; and
a non-volatile memory storing computer program code that when executed on the processor causes the processor to execute a process operable to perform the operations of:
receiving an I/O request to write a block, the I/O request being received at a first node of a distributed storage system;
splitting the block into a plurality of sub blocks;
generating a sub block error detection hash for each of the sub blocks;
storing the block and the sub block error detection hashes to a storage device at a second node within the distributed storage system;
receiving, at the first node, an I/O request to read one or more sub blocks of the block;
reading the requested sub blocks and corresponding sub block error detection hashes from the storage device at the second node;
generating, at the second node, an expected error detection hash using the read sub block error detection hashes;
sending the read sub blocks and the expected error detection hash from the second node to the first node;
generating, at the first node, an actual error detection hash of the read sub blocks; and
reporting data corruption if the actual error detection hash and expected error detection hash do not match.

12. The system of claim 11 wherein the computer program code causes execution of a process to generate an expected error detection hash using the read sub block error detection hashes by:

concatenating the read sub block error detection hashes together to produce a concatenated sub Hock error detection hash; and calculating a hash of the concatenated sub block error detection hash.

13. A system comprising:

a processor:

a volatile memory; and a non-volatile memory storing computer program code that when executed on the processor causes the processor to execute a process operable to perform the operations of:

receiving an I/O request to write a block, the I/O request being received at a first node of a distributed storage system;

splitting the block into a plurality of sub blocks;

generating a sub block error detection hash for each of the sub blocks;

storing the block and the sub block error detection hashes to a storage device at a second node within the distributed storage system;

receiving, at the first node, an I/O request comprising one or more updated sub blocks;

generating an updated sub block error detection hash for each of the updated sub blocks;

sending the updated sub blocks and the updated sub block error detection hashes from the first node to the second node;

reading one or more original sub blocks and corresponding sub block error detection hashes from the storage device;

generating an updated block using the original sub blocks and the updated sub blocks; and writing the updated block, the original sub block error detection hashes, and the updated sub block error detection hashes to the storage device.

14. A computer program product tangibly embodied in a non-transitory computer-readable medium, the computer-readable medium storing program instructions that are executable to:

receive an I/O request to write a block;

split the block into a plurality of sub blocks;

generate a sub block error detection hash for each of the sub blocks; and calculating a block error detection hash by concatenating the sub block error detection hashes together to produce a concatenated sub block error detection hash and calculating a hash of the concatenated sub block error detection hash; and storing the block error detection hash as metadata within a content-aware storage system.

* * * * *

UNITED STATES PATENT AND TRADEMARK OFFICE
CERTIFICATE OF CORRECTION

PATENT NO. : 10,152,371 B1
APPLICATION NO. : 15/281593
DATED : December 11, 2018
INVENTOR(S) : Gilad Braunschvig et al.

It is certified that error appears in the above-identified patent and that said Letters Patent is hereby corrected as shown below:

In the Claims

Column 13, Line 2, delete "Hock" and replace with --block--.

Signed and Sealed this
Second Day of July, 2019

Andrei Iancu
*Director of the United States Patent and Trademark Office*